March 31, 1925.
G. D. POGUE
1,531,874
IGNITION SWITCH AND EMERGENCY BRAKE SIGNAL FOR POWER OPERATED VEHICLES
Filed Nov. 24, 1923      2 Sheets-Sheet 1
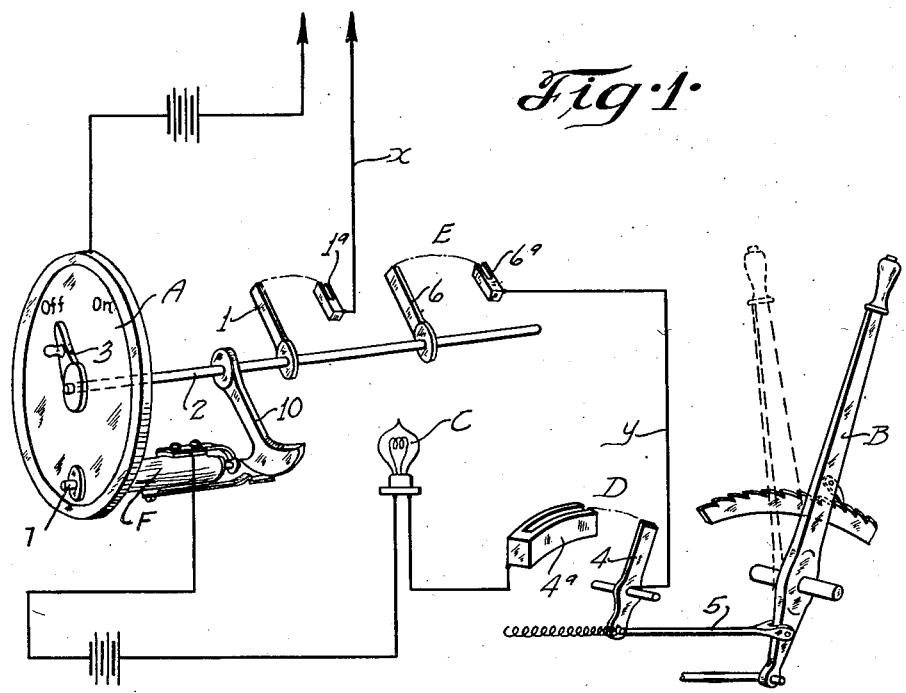
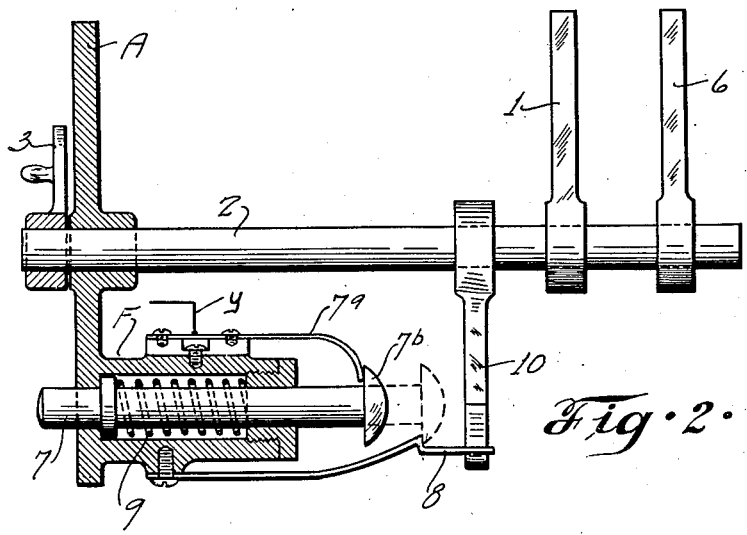
INVENTOR
George D. Pogue.
By Bakewell Church
ATTORNEYS

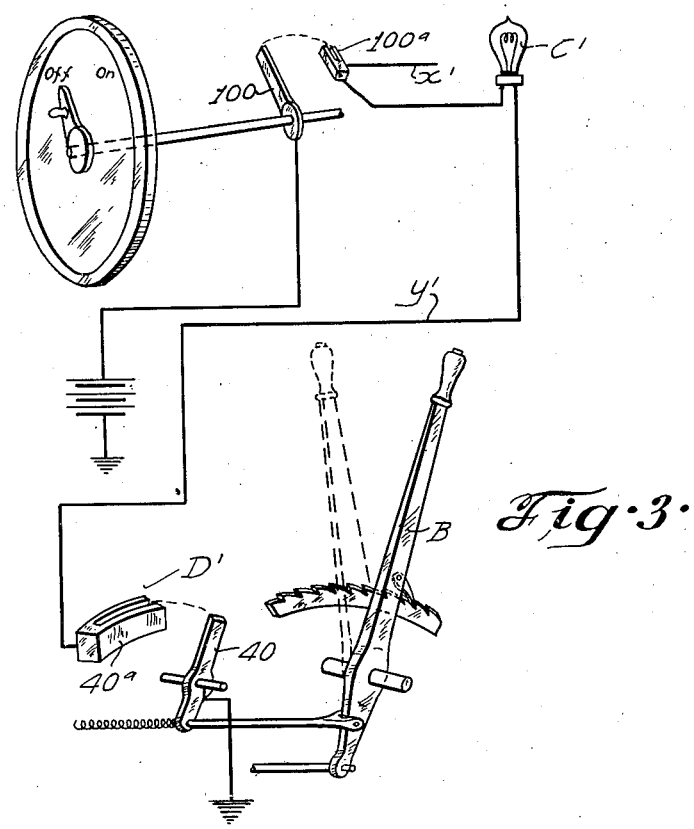

Patented Mar. 31, 1925.

1,531,874

UNITED STATES PATENT OFFICE.

GEORGE D. POGUE, OF MOUNT VERNON, NEW YORK.

IGNITION SWITCH AND EMERGENCY-BRAKE SIGNAL FOR POWER-OPERATED VEHICLES.

Application filed November 24, 1923. Serial No. 676,816.

*To all whom it may concern:*

Be it known that I, GEORGE D. POGUE, a citizen of the United States, residing at Mount Vernon, New York, have invented a certain new and useful Improvement in Ignition Switches and Emergency-Brake Signals for Power-Operated Vehicles, of which the following is a full, clear, and exact description, such as will enable others skilled in the art to which it appertains to make and use the same.

This invention relates to automobiles and other power-operated vehicles of the kind that are equipped with manually-operable emergency brakes and an electrical ignition system.

In operating vehicles of the kind referred to it frequently happens that the driver will start the vehicle without first releasing the emergency brakes and then run the vehicle a considerable distance with the emergency brakes "set" or in operative condition, resulting in excessive wear on the brake drums, brake band linings and other parts of the driving mechanism and also increasing the fuel consumption. Another thing that frequently occurs is the running down or discharge of the electric storage battery used to operate the ignition system, due to accidentally turning the switch of the ignition system into its "on" position, when the motor is not in operation, or the omission to turn said switch into its "off" position after the engine has been stopped.

The main object of my invention is to provide a means which tends to prevent an automobile or the like from being operated with the emergency brakes "set" and which tends to prevent the battery from being run down through carelessness or inattention on the part of the driver.

To this end I have devised an ignition switch and emergency brake signal for power-operated vehicles which comprises a signal and means for causing said signal to operate in the event the ignition switch is moved into its "on" position when the emergency brakes are "set" or in the event the emergency brakes are set or rendered operative when the ignition switch is in its "on" position.

In a vehicle equipped with a signaling mechanism of the kind above described the starting of the engine when the emergency brakes are "set" causes the signal to operate, thus warning the driver that the emergency brakes should be released before the vehicle is put in motion, and if the vehicle is stopped by "setting" the emergency brakes without turning the ignition switch to render the ignition mechanism inoperative, the signal will operate, thus warning the driver that the ignition switch should be turned into its "off" position so as to avoid running down the battery, or causing injury to the coils or wiring. In order that the engine may be operated with the emergency brakes "set", without causing the signal to operate and continue in operation, I have provided a manually-operable means for cutting the signal out of service, and in order that the mechanism will not remain in an inoperative condition, due to oversight of the driver to cut the signal back into service again, I have provided means for automatically cutting the signal back into service whenever a certain governing member of the vehicle is moved from one position into a different position at a time when the signal is cut out of service. While the signal cut-out mechanism is not essential to the successful operation of my system, it adds greatly to the commercial utility of the system, as it is often necessary to have the engine of an automobile continue in operation for an extended period, when the emergency brakes are "set", for example, in testing or tuning up the engine, and at such times it would be unnecessary and even objectionable with some types of signals to have the signal operate continuously for a long period.

Any suitable type or kind of signal may be used, but I prefer to use an electrically-operated signal either of the visible type, such as a small incandescent lamp arranged in such position that it is within plain view of the driver, or of the audible type, such as a bell, buzzer or electric horn that forms part of the usual equipment of an automobile. The electric circuit in which the signal is arranged is so designed that it can be opened and closed at least two points, and while the electrical energy used to operate said circuit can be taken from any suitable source, I prefer to operate the signal circuit from the battery that is used to energize the starting, ignition and lighting circuits of the vehicle. If the signal is arranged in a circuit that is normally open, said circuit is equipped with one switch or circuit closing device that moves automatically into its closed position whenever the controlling member of the ignition switch is moved into its "on" position, and a second switch or circuit closing device that moves automatically into its closed position whenever the emergency brake lever is moved to "set" the emergency brakes. The cut-out device for throwing the signal out of service preferably consists of a manually-operable switch in the signal circuit that is normally closed, but which is adapted to be moved to open the signal circuit, an automatic locking means for holding said manually-operable switch in its open position and a tripping device for said locking means combined with a governing member of the vehicle, such as the controlling element of the ignition switch, in such a way that it will operate in unison with same.

Figure 1 of the drawings is a perspective view of an ignition switch and emergency brake signal for automobiles constructed in accordance with my invention.

Figure 2 is a detail sectional view of the mechanism for manually cutting the signal out of service at certain times and for thereafter automatically cutting said signal into service again; and Figure 3 is a perspective view, illustrating another way of connecting up the co-operating parts of the device.

Referring to the drawings which illustrate the preferred form of my invention, A designates as an entirety the switch that governs the ignition system of an automobile or similar vehicle, said switch comprising a movable switch element 1 that is adapted to be moved into and out of engagement with a contact 1ª arranged in the ignition circuit $x$, an actuating shaft 2 for said switch element and a controlling member 3 on said actuating shaft that is adapted to be moved into one position, which I will refer to as its "on" position, when it is desired to render the ignition system operative, and into a different position, which I will refer to as its "off" position, when it is desired to render the ignition system inoperative. B designates the emergency brake lever, which, when arranged in one position that I will refer to as its released position, causes the emergency brakes of the vehicle to be inoperative, and when arranged in another position that I will refer to as its "set" position, causes the emergency brakes to become operative. C designates a signal, herein illustrated as a small incandescent electric lamp arranged in a signal circuit $y$ that can be energized either by the same source of power used to operate the ignition system, or by a separate source of power, and D and E designate two switches arranged in the signal circuit in series with each other and in series with the signal C. The movable element 4 of the switch D is connected with the emergency brake lever by a link or other means 5 in such a way that said element will be moved into engagement with its co-operating contacts 4ª whenever the emergency brake lever B is moved into its "set" position, shown in broken lines in Figure 1, and moved out of engagement with said contacts, thus opening the signal circuit whenever said emergency brake lever is moved into its released position, shown in full lines in Figure 1. The movable element 6 of the other switch in the signal circuit is connected to the operating shaft 2 of the ignition switch in such a way that whenever the controlling member 3 of the ignition switch is turned into its "on" position, the element 6 will move into engagement with its co-operating contacts 6ª, thus closing the signal circuit, and whenever said controlling member is moved into its "off" position, the element 6 will move out of engagement with the contacts 6ª, thus opening the signal circuit.

If the emergency brake lever is in its released position the act of turning on the ignition switch to render the ignition mechanism operative has no effect on the signal C, due to the fact that the switch D is then open. If, however, the emergency brake lever is in its "set" position, as is the usual condition of the emergency brake lever of an automobile when the automobile is not in motion, the act of turning on the ignition switch closes the switch E, thereby causing the signal C to operate and thus notify the driver that the emergency brake lever should be released before the automobile is set in motion, said signal continuing in operation until the emergency brake lever is released, or until the controlling member 3 of the switch is moved into its "off" position, it being obvious that the movement of the emergency brake lever into its released position opens the switch D, and thus renders the signal inoperative. When the automobile is in normal operation, namely, with the emergency brake lever released and the ignition switch closed, the signal C will be inoperative, but when the automobile is stopped and the emergency brake lever is moved into its "set" position, the signal C will become operative, if the ignition switch is left in its "on" position, thus notifying the driver that the controlling member 3 of the ignition switch should be moved into its "off" position in order to prevent running down the battery.

From the foregoing it will be seen that a signaling mechanism of the kind above described tends to correct two inherent defects in the conventional automobile, in that it warns the driver when the automobile is put in motion with the emergency brakes "set," and it warns the driver when the ignition switch is left in its "on" position while the automobile is standing at rest with the emergency brakes "set."

The cut-out mechanism for the signal previously referred to is formed preferably by a manually-operable switch in the signal circuit $y$ composed of a spring-actuated plunger 7 and a contact $7^a$ that normally is in engagement with a head $7^b$ on the plunger 7, said manually-operable switch being designated by the reference character F in Figure 2. When said plunger is moved in a direction to disengage the head $7^b$ thereon from the contact $7^a$, a locking means formed by a spring 8 will engage the head of said plunger, as shown in broken lines in Figure 2, and thus hold the switch F in its open position. At such times the emergency brake lever can be arranged in its "set" position and the controlling member 3 of the ignition switch can be arranged in its "on" position, without causing the signal C to operate, due, of course, to the fact that the switch F holds the signal circuit open. Unless means were provided for automatically restoring the switch F to its closed position, the entire system might be rendered ineffective, due to oversight on the part of the driver to move the plunger 7 of the switch F into its closed position. Therefore, I provide means for automatically tripping the locking means 8 for the switch F, thus permitting the plunger 7 to move into engagement with its co-operating contact $7^a$, under the influence of its actuating spring 9 under certain conditions, for example, whenever one of the main governing members of the vehicle is actuated. In the form of my invention herein illustrated the locking means 8 is tripped or rendered inoperative by an arm 10 on the operating shaft 2 of the ignition switch, said arm being so arranged that the movement of the controlling member 3 of the ignition switch from its "on" position into its "off" position causes the arm 10 to engage the spring 8 and move it in a direction to release the plunger 7 of the switch F. Accordingly, if the signal C has been cut out of service so as to enable the engine to be tested or tuned up while the emergency brakes are "set," the next time the ignition switch is turned off the signal circuit will be restored automatically to its normal condition, due to closing of the switch F, thus eliminating the possibility of the mechanism remaining in an inoperative condition, due to failure on the part of the driver to close the switch F.

While I prefer to arrange the co-operating elements of the mechanism in the manner above described, I do not wish it to be understood that my invention is limited to a mechanism in which the signal circuit is normally open.

In Figure 3 I have illustrated how my invention can be applied to power-operated vehicles equipped with a form of wiring that is now in general use. In said figure the signal $C'$ is arranged in a grounded signal circuit $y'$ that is tapped onto the ignition circuit $x'$, said signal being connected to the stationary contacts $100^a$ of the ignition switch so as to cause the signal circuit to be controlled in part by the ignition switch. A switch $D'$ that is arranged in the signal circuit has its movable element 40 connected with the emergency brake lever B in such a way that the movement of said lever in a direction to set the emergency brakes causes the switch element 40 to move into engagement with its contacts $40^a$, thus closing the switch $D'$. If the movable element 100 of the ignition switch is then in engagement with its co-operating contacts $100^a$ the signal $C'$ will become operative, thus warning the driver that the ignition switch should be turned into its "off" position. Likewise, if the ignition switch is moved into its "on" position when the emergency brake lever B is set, the signal $C'$ will become operative, thus warning the driver that the emergency brake lever should be released before the vehicle is set in motion.

Having thus described my invention, what I claim as new and desire to secure by Letters Patent is:

1. In a power-operated vehicle provided with an ignition system, the combination of an ignition switch for controlling the ignition circuit, an emergency brake, an electrically-operated signal, an energizing circuit for said signal, two controlling switches for said signal arranged in said circuit in series relation to each other, means operable conjointly with said emergency brake for actuating one of said controlling switches, an independent means operable conjointly with the ignition switch for actuating the other signal controlling switch, a manually-operable means for changing the condition of the signal circuit so as to render the signal inoperative, and means for automatically restoring said manually-operable means to its normal condition when a governing member of the vehicle is operated at a time when said manually-operable means is operative.

2. In a power-operated vehicle provided with an ignition system, an ignition circuit, a signal circuit, a signal in said signal circuit, an emergency brake, an ignition switch for controlling the ignition circuit, two controlling switches for the signal arranged in the signal circuit in series relation, means for effecting a change in the condition of one of said signal controlling switches when the ignition switch is actuated, an independent means for effecting a change in the condition of the other signal controlling switch when the emergency brake is actuated, a manually-operable device for opening the signal circuit, and means rendered operative by the movement of the ignition switch for causing said manually operable device to be restored to its normal position in the event the position of the ignition switch is changed at a time when said manually-operable device is performing the function for which it was designed.

GEORGE D. POGUE.